US006208706B1

(12) United States Patent
Campbell et al.

(10) Patent No.: US 6,208,706 B1
(45) Date of Patent: Mar. 27, 2001

(54) METHOD AND APPARATUS TO INCREASE THE OPERATIONAL TIME OF A TOMOGRAPHIC SCANNER

(75) Inventors: Robert B. Campbell, Naperville; Gerald J. Carlson, Lombard, both of IL (US)

(73) Assignee: Picker International, Inc., Highland Heights, OH (US)

( * ) Notice: Subject to any disclaimer, the term of this patent is extended or adjusted under 35 U.S.C. 154(b) by 0 days.

(21) Appl. No.: 09/178,801

(22) Filed: Oct. 26, 1998

(51) Int. Cl.[7] .................................................... G01N 23/00
(52) U.S. Cl. .................................................. 378/9; 378/92
(58) Field of Search ............................................. 378/9, 92

(56) References Cited

U.S. PATENT DOCUMENTS

| | | | |
|---|---|---|---|
| 3,906,235 * | 9/1975 | Fischer | 378/92 |
| 4,032,788 | 6/1977 | Stege et al. | 250/414 |
| 4,057,725 * | 11/1977 | Wagner | 378/9 |
| 4,150,293 | 4/1979 | Franke . | |
| 4,384,359 | 5/1983 | Franke . | |
| 4,672,651 * | 6/1987 | Horiba | 378/9 |
| 5,604,778 | 2/1997 | Polacin et al. . | |

FOREIGN PATENT DOCUMENTS

| | | |
|---|---|---|
| 1764202 | 6/1971 | (DE) . |
| 0 080 691A1 | 6/1983 | (EP) . |
| 0 557 981A1 | 9/1993 | (EP) . |
| 1105085 | 3/1968 | (GB) . |

* cited by examiner

*Primary Examiner*—Craig E. Church
(74) *Attorney, Agent, or Firm*—Fay, Sharpe, Fagan, Minnich & McKee, LLP

(57) ABSTRACT

A CT scanner includes a stationary gantry (10) defining an examination region (12) and a rotating gantry (16) which rotates about the examination region. At least two x-ray tubes (18*a,* 18*b*), each capable of producing a beam of radiation directed through the examination region, are mounted to the rotating gantry. The x-ray tubes are switchably connected to an electrical power supply (24). X-rays are detected by an arc of x-ray detectors (14) which generate signals indicative of the radiation received. These signals are processed by a reconstruction processor (32) into an image representation. A thermal calculator (60) estimates when an anode in one of the x-ray tubes (18) reaches a selected temperature. The thermal calculator (60) controls a switch (28) which is electrically connected between the x-ray tubes and the power supply. The switch selectively switches power from the power supply alternately to the x-ray tubes. Each time the thermal calculator estimates that the anode of one of the x-ray tubes has reached selected temperature, that tube is switched off and the other tube is switched on.

16 Claims, 3 Drawing Sheets

METHOD AND APPARATUS TO INCREASE THE OPERATIONAL TIME OF A TOMOGRAPHIC SCANNER

BACKGROUND OF THE INVENTION

The present invention relates to the imaging arts It finds particular application in conjunction with CT scanners and will be described with particular reference thereto. It is appreciated, however, that the invention will also find application in conjunction with other types of devices in which x-rays or electromagnetic radiation is used to generate images.

In early x-ray tubes, electrons from a cathode filament were drawn at a high voltage across a vacuum to a stationary target anode. The impact of the electrons caused the generation of x-rays, as well as significant thermal energy. As higher power x-ray tubes were developed, the thermal energy became so large that extended use damaged the anode. Thus, ways to reduce or dissipate the thermal energy were required.

There are various generally accepted ways to transfer heat energy; namely, convection, conduction, and radiation. With reference to x-rays tubes, convection is ineffective due to the vacuum in which the anode is located. Thus, radiation and conduction remain the primary methods of heat exchange. Both conduction and radiation dissipate heat more slowly than it is generated.

A popular solution is to mount anodes rotatably in the vacuum. By rotating the anode, the thermal energy is distributed over a larger area. However, when the rotating anode tubes are operated for longer durations at high power, the thermal buildup can again damage the electrode. Radiation transfers heat slowly, more slowly than it is added during x-ray generation. Conduction removes heat more efficiently than convection or radiation. However, in a rotating anode x-ray tube the only conduction path is typically through a bearing on which the anode is mounted. Not only does the passage of heat through a bearing degrade it, but the conduction is still slower than the rate at which energy is added. The circulation of cooling fluid through the bearing causes numerous fluid and vacuum sealing difficulties.

Thus, the limited thermal cooling rates have led to duty cycle requirements which limit x-ray generation durations and increase the interval between successive operations. Initially, x-ray exposure times were relatively short, and the time between these exposures was relatively long. Long set-up times are typical today in many applications, e.g. x-rays for orthopedic or dental evaluation, single slice CT scans and the like. Short exposure times coupled with subject repositioning provide the time for the anode to transfer the heat generated. Thus, duty cycle restrictions in these applications are rarely a problem. However, with the advent of the CT scanner, particularly spiral and volume CT scanners, the duty cycle restrictions are again limiting the rapidity with which repetitions can be performed.

Aside from imposed duty cycles, present x-ray tubes also restrict operations periodically due to failure conditions. For example, most all present x-ray machines, including commercially available CT scanners, contain a single x-ray tube. When the tube fails, the machine is inoperable until a replacement tube can be installed. However, because these tubes are very expensive, 'spares' are usually not kept on hand. Moreover, x-ray tubes usually are replaced only by specialized, trained personnel. Purchase and installation of the replacement tube can take as long as several days. Thus, when this one component of a CT scanner fails, an expensive machine with tremendous diagnostic capabilities is idled.

Beyond single tube machines, multiple tube scanners such as disclosed in Franke U.S. Pat. No. 4,150,293; Franke U.S. Pat. No. 4,384,395; and Polacin et. al. U.S. Pat. No. 5,604,778 compound the failure problem. Multiple tube systems use a plurality of tubes simultaneously to shorten the amount of rotation required in order to obtain a complete image. However, these systems depend on all of the plurality of x-ray tubes being operational. Said another way, the multi-tube systems are only as reliable as the weakest tube, and the likelihood of failure increases by the number of tubes used.

Potentially more disruptive than complete tube failure is the arcing typically seen in x-ray tubes nearing the end of their useful lives. As a tube ages, its vacuum becomes harder to maintain, and as the vacuum is lost periodic arcing is observed. This arcing causes ions to be freed within the tube further fouling the vacuum. Moreover, following arcing the tube requires a 'rest' time while the vacuum is reestablished after which the tube is ready to use again. Gradually the 'off' times lengthen while the 'on' times ebb. Notwithstanding the increased duty cycle times that these rests impose, aging tubes are not typically replaced as they begin to arc. Rather, the situation is allowed to deteriorate before tube replacement.

The present invention contemplates a new, efficient x-ray tube, CT gantry and method of use which overcomes the above referenced problems and others.

BRIEF SUMMARY OF THE INVENTION

In accordance with an aspect of the present invention, a CT scanner is provided. The scanner includes a stationary gantry portion defining an examination region and a rotating gantry portion which rotates about the examination region. A plurality of x-ray tubes are mounted to the rotating gantry portion such that each can produce a beam of radiation through the examination region. The x-ray tubes are switchably connected to an electrical power source. A plurality of x-ray detectors are mounted to the stationary gantry are for receiving the radiation that has traversed the examination region. The detectors generate signals indicative of the radiation received. These signals are processed by a reconstruction processor into an image representation. Additionally, a thermal calculator estimates when a temperature of an anode in one of the x-ray tubes approaches a selected temperature. A switch, controlled by the thermal calculator, selectively switches power from the power source to one of the x-ray tubes in response to the thermal calculator's estimate that the selected temperature has been reached.

In accordance with a more limited aspect of the present invention, the thermal calculator includes at least one timer which times a length of time that an x-ray tube has been on. A thermal profile memory stores at least one time/temperature curve for anodes at selected power levels. A comparator applies the time from the timer to the thermal profile memory to estimate anode temperature and to determine that the selected temperature has been reached.

In accordance with an alternate embodiment of the present invention, the thermal calculator includes at least one temperature sensor which provides a temperature signal representative of the anode temperature. A comparator compares this sensed temperature to a selected temperature and controls the switch based on the comparison.

In accordance with a more limited aspect of the present invention, the CT scanner further includes an angular position encoder for generating an angle signal which represents a present angular position of the rotating gantry relative to the examination region. Connected with the angular position encoder and the switch, a delay circuit notes an angular position at which a first of the x-ray tubes was switched off and delays switching a second of the x-ray tubes on until the second tube approaches the noted angular position.

In accordance with a more limited aspect of the present invention, the CT scanner further includes an x-ray tube failure detector which detects when an x-ray tube fails and provides a fail signal to the switch to prevent the switch from powering the failed x-ray tube.

In accordance with another aspect of the present invention, a method of diagnostic imaging is provided. The method includes rotating a plurality of x-ray sources about a subject while alternatingly powering the x-ray sources to pass x-rays through the subject. The x-rays are received and signals are generated. The corresponding signals are then reconstructed into an image representation of the subject.

In accordance with a more limited aspect of the present invention, the alternatingly powering of the x-ray sources step includes noting an angular position when a first of the x-ray sources is depowered, and then powering a second of the x-ray sources at the angular position noted.

In accordance with a more limited aspect of the present invention, the alternatingly powering of the x-ray sources step includes monitoring a temperature of the x-ray source being powered. The monitored temperature is then compared with preselected temperature conditions, and a determination of whether to power another x-ray source is made based on the comparison.

In accordance with a more limited aspect of the present invention, the alternatingly powering of the x-ray sources step includes measuring a time the x-ray source is powered and measuring power into the powered x-ray source. The time and power are compared with a stored thermal profile to determine whether to switch to another x-ray source.

In accordance with another aspect of the present invention, a method of diagnostic imaging is provided. The method includes concurrently rotating at least a first x-ray tube and a second x-ray tube around a subject. Then, cyclically, powering the first x-ray tube to generate x-rays while the second x-ray tube cools, and powering the second x-ray tube to generate x-rays while the first x-ray tube cools. X-rays from the first and second tubes that have passed through the subject are received and converted into electrical signals. The electrical signals are processed into an electronic image representation which is converted into a human readable display.

In accordance with a more limited aspect of the present invention, the cyclically powering step includes monitoring thermal loading conditions of the one of the first and second x-ray tubes that is being powered and comparing those conditions with preselected thermal loading conditions. The cyclical powering is done in response to the comparison.

In accordance with a more limited aspect of the present invention, the cyclically powering step includes powering a third x-ray tube to generate x-rays while the first and second tubes cool.

In accordance with a more limited aspect of the present invention, the method further includes monitoring the x-ray tubes for an arcing condition. In response to arcing, switching between the x-ray tubes is inhibited.

In accordance with a more limited aspect of the present invention, the method further includes monitoring the x-ray tubes for a failure condition. In response to the monitoring step, switching between the x-ray tubes is inhibited.

In accordance with a more limited aspect of the present invention, after monitoring the failure condition in one of the x-ray tubes the method further includes, performing diagnostic imaging procedures with the other x-ray tube until scheduled imaging procedures are completed. Then after the procedures are completed, the failed x-ray tube is replaced.

In accordance with another aspect of the present invention, a method is provided for diagnostic imaging in which x-ray are passed through a subject, received on a plurality of detectors, and processed into an image representation which is displayed. The method further includes powering a first of at least two x-ray tubes for a first amount of time to pass x-rays through the subject. Then switching power from the first x-ray tube to a second x-ray tube and powering the second x-ray tube for a second amount of time to pass x-rays through the subject. After the second amount of time, switching power from the second x-ray tube to the first x-ray tube.

In accordance with a more limited aspect of the present invention, the method further includes determining a temperature of an anode of the powered x-ray tube and switching the power in response to the determined temperature.

In accordance with a more limited aspect of the present invention, the determining step further includes integrating an amount of power supplied to the powered x-ray tube over a duration the tube is powered. The integrated power is then compared with a thermal profile indicative of heating characteristics of the anode.

One advantage of the present invention is that down times imposed by heat exchange duty cycles are reduced or eliminated resulting in higher patient throughput.

Another advantage of the present invention is the ability to operate in a reduced capacity mode if one x-ray tube fails, enabling the scanner to continue to operate, although on a reduced patient throughput basis.

Other benefits and advantages of the present invention will become apparent to those skilled in the art upon a reading and understanding of the detailed description of the preferred embodiments.

BRIEF DESCRIPTION OF THE DRAWINGS

The invention may take physical form in various parts and arrangements of parts and in various steps, and arrangements of steps. The drawings are only for purposes of illustrating the preferred embodiments and are not to be construed as limiting the invention.

DETAILED DESCRIPTION OF THE PREFERRED EMBODIMENT

Figure 1:
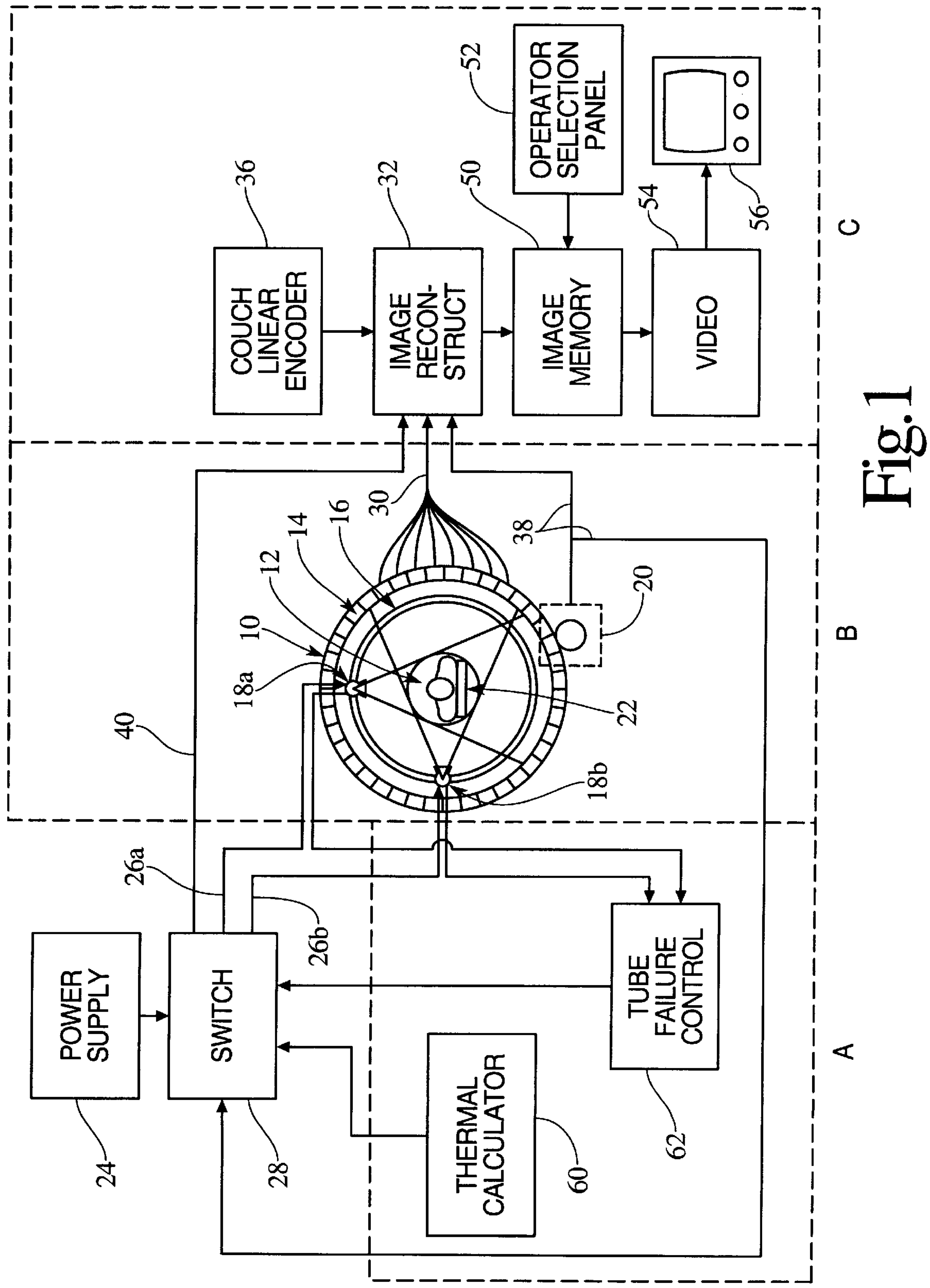
FIG. 1 is a schematic diagram of the multi-tube CT gantry in accordance with the present invention.

A multi-tube CT scanner may be best understood by division into a control portion A, an examination area and CT scanner hardware portion B and an image processing section C.

Starting with the examination area and CT scanner hardware portion B, a stationary gantry portion 10 defines an examination region 12 surrounded by one or more rings of x-ray detectors 14. A rotating gantry portion 16 supports two x-ray tubes 18*a*, 18*b* which irradiate the examination region 12 when energized. The x-ray tubes are preferably positioned to irradiate a common slice, but may advantageously be offset longitudinally to irradiate parallel slices. A motor 20 rotates the gantry 16 continuously, in the preferred spiral scanning embodiment. The patient is supported on a patient couch 22 which is advanced by a drive (not shown). In the preferred spiral scanning embodiment, the couch 22 moves longitudinally as the x-ray tubes rotate such that the subject is irradiated along a spiral trajectory. The tubes 18*a*, 18*b* are interruptibly connected to a power supply 24 via power lines 26*a*, 26*b* by a switch 28. When each of tubes 18*a*, 18*b* are powered, it generates a fan-shaped beam of x-rays which passes through the examination region 12 to an arc segment of the ring of x-ray detectors 14. The detectors 14 convert the x-rays received into electrical signals. The signals are forwarded on receptor line 30 to the image processing section C.

The image processing section C includes an image reconstruction processor 32. Because the rotating gantry portion 16 spins and the couch 22 slides through the examination region 14 longitudinally, the image reconstruction processor 32, needs angular and linear position information to reconstruct a volume image representation from the signals from the detectors 14. In the preferred embodiment, the longitudinal couch position information is provided on a line 34 from a linear encoder 315 to the image reconstruction processor 32. The angular x-ray source position information is provided on a line 38 from the motor 20 or other angular position encoder. Moreover, because only one of a plurality of x-ray tubes 18 is operating at any one time, the image reconstruction processor 32 is supplied data regarding which x-ray tube is operating. Data identifying the operating tube is sent on a line 40 from the switch 28 to the image reconstruction processor 32.

In an alternate embodiment, available with fourth generation CT scanners having a continuous ring of detectors elements 14, the physical connection identifying the operating tube may be omitted. In these fourth generation scanners, the arc of detectors which receive the radiation identifies which x-ray tube is in use. Said another way, since only one x-ray tube is producing radiation at any one time, the reception of radiation by fixed detectors with known positions identifies the location, hence which of, the tubes is operating, i.e. the one which is 180° opposite to the center of the radiated detectors.

When switching between tubes on the fly, the oncoming tube is angularly offset from the off-going tube 18. However, the tubes 18 are displaced angularly by a fixed physical mount within the rotating gantry 16. This angular displacement can be demonstrated by assuming tube 18*a* is the tube in use and the switch 28 switches the power to tube 18*b*. To minimize radiation exposure, tube 18*b* is not powered until it rotates around to the position where tube 18*a* was when tube 18*a* was shut off. The longitudinal advance of the couch is paused while no tube is on. Preferably, the angular displacement data from line 38 is used to determine the angular offset information supplied to the switch 28 in addition to the image reconstruction processor 30. The switch 28 powers the on-coming x-ray tube when it reaches the position of the previous tube 18. Preferably, the second tube is activated a few degrees before the switch-over angular position and the redundant data is averaged or compared for consistency. A mechanical shutter (not shown) can also be used to control which of the x-ray tubes irradiates the patient and hence the detectors.

Referring again to section C, following image reconstruction, the image is stored in a volume image memory 50. A operator keyboard 52 selects portions of the volume image data for display. A video processor 54 converts the selected image data into an appropriate format for display on a monitor 56.

The x-ray tube control portion A regulates power to the x-ray tubes 18. As discussed above, the power supply 24 feeds the switch 28 which directs power to one of the plurality of x-ray tubes 18. In the illustrated two tube embodiment, the switch alternates between the tubes 18*a* and 18*b* based on an output switching signal from a thermal calculator 60. In the preferred embodiment, the thermal calculator 60 estimates the temperature of the anode of the operating x-ray tubes 18 and generates the switching signal that controls the switch 28 upon reaching a selected temperature. This feature is more fully explored below when referring to FIGS. 2 and 3.

The x-ray tube control portion A also includes a failure detector 62 which detects failure conditions from the x-ray tubes 18 and sends a failed signal to the switch 28. Various failure conditions are contemplated, such as the sudden change in tube voltage or current associated with arcing, the change in filament current associated with filament burnout, and the like. The presence of a failure signal prevents the switch from selecting and powering the failed x-ray tube. When one tube fails, the CT scanner reverts to operation as a conventional single tube scanner. That is, the scanner is still fully operative but restricted. in the available duty cycles.

Figure 2:
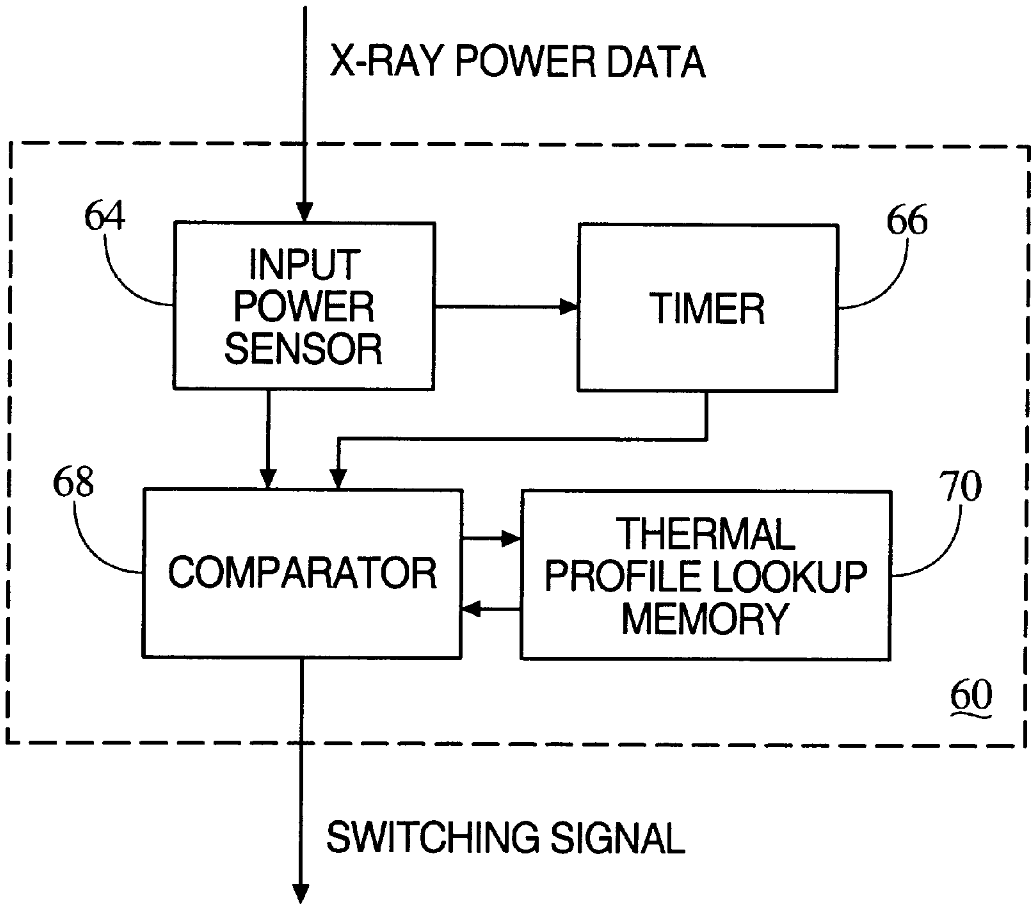
FIG. 2 details one embodiment of a thermal monitoring component of the multi-tube CT gantry.

With reference to FIG. 2, one embodiment of the thermal calculator 60 includes an input power sensor 64 which receives a signal representing the power being applied to the x-ray tube 18 in use. The sensor 64 provides a start and stop signal to a timer 66 indicative of when power was initially supplied and when the supply of power was terminated. After receiving the start signal, the timer 66 begins to time the length of time power is applied to the x-ray tube 18. A comparator 68 receives an elapsed time signal and compares the elapsed time with a predetermined thermal profile from a thermal profile lookup memory 70. The thermal profile memory 70 stores profiles for various operating conditions, such as the power level at which the x-ray tube 18 is operated, duty cycle, time since prior activation, and the like. When the anode is calculated to have been subjected to a preselected maximum heat build up, based on the time and the profile, the comparator 68 generates the switching signal for the switch 28. Preferably, the timer 66 also calculates the cooling time from when a tube was turned off until it is turned on again. The comparator 68 uses the cooling time to determine the temperature of the anode at the start of the next x-ray tube operation. The starting temperature is used to select among a family of thermal. profiles in the memory 70 or to provide an offset along EL thermal profile.

Figure 3:
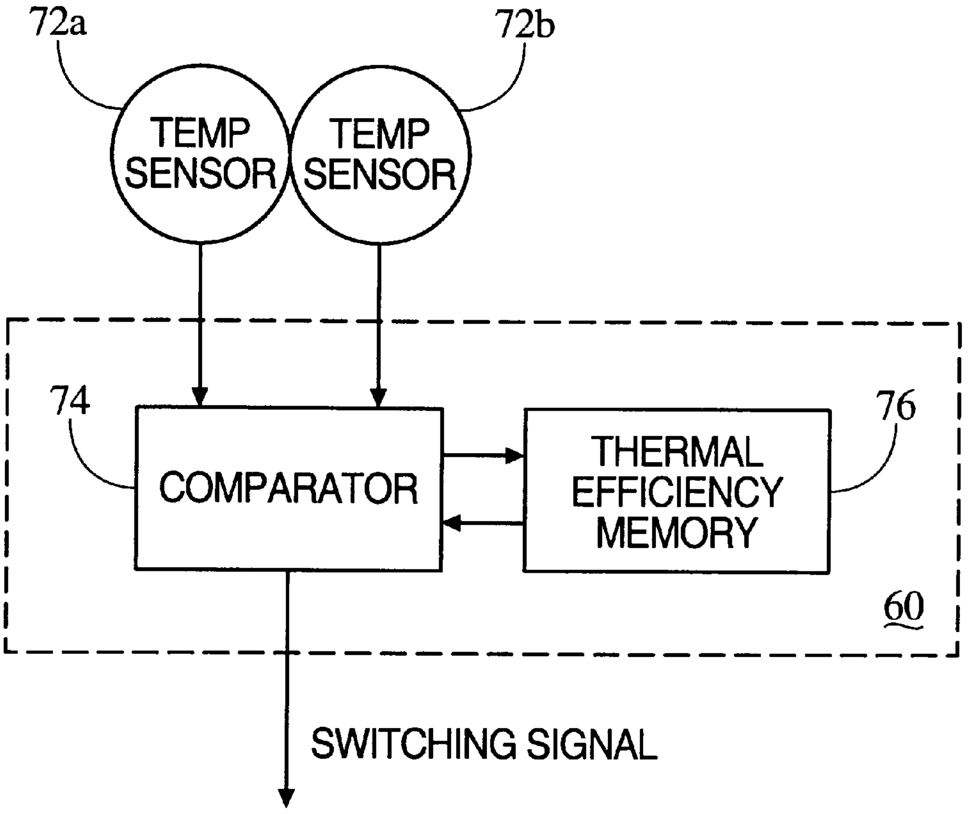
FIG. 3 details a second embodiment of a thermal monitoring component of the multi-tube CT gantry.

With reference to FIG. 3, another embodiment of the thermal calculator 60 includes two temperature sensors 72*a*, 72*b* located near the vacuum tubes of each x-ray tube 18*a*, 18*b* to measure temperature directly. The temperature sensors 72*a*, 72*b* in one embodiment sense the temperature remotely by monitoring an infrared spectrum emitted by the anode, but could also be configured as other direct heat measurement devices. These sampled temperatures are sent to a comparator 74 which compares the sampled temperatures to target temperatures stored in a temperature efficiency memory 76. The temperature efficiency memory 76 is a stored table of selected heating and cooling thermal profiles (time vs. temperature curves) specific to the anodes in the x-ray tubes 18. When heating of the tube in use is maximized vis-a-vis cooling of the tube not in use, the comparator 74 generates a switching signal for the switch 28.

It is to be appreciated that although FIG. 1 shows two x-ray tubes 18*a*, 18*b*, the present invention envisions that more may be provided further enhancing the objects of the invention. Moreover, while FIG. 1 shows these x-ray tubes 18*a*, 18*b*, spaced at approximately 90° apart, the present invention contemplates other off axis separations. The present invention foresees either a fourth generation gantry using a continuous detector set as illustrated and referenced by 14, or a third generation gantry using a partial detector set rotatably mounted opposite an x-ray tube (not shown).

The invention has been described with reference to the preferred embodiments. Potential modifications and alterations will occur to others upon a reading and understanding of the specification. It is intended that the invention be construed as including all such modifications and alterations insofar as they come within the scope of the appended claims or the equivalents thereof.

Having thus described the preferred embodiments,, the invention is now claimed to be:

1. A CT scanner comprising:

a stationary gantry portion defining an examination region;

a rotating gantry portion for rotating about the examination region;

a plurality of x-ray tubes mounted to the rotating gantry portion for producing a beam of radiation passing through the examination region;

a plurality of x-ray detectors for receiving the radiation which has traversed the examination region and for generating signals indicative of the radiation received;

a reconstruction processor for processing the received radiation signals into an image representation;

a thermal calculator for estimating when a temperature of an anode in one of the x-ray tubes approaches a selected temperature; and a switch assembly electrically connected between the x-ray tubes and a power source and controlled by the thermal calculator for selectively switching power from the power source to one of the x-ray tubes in response to the thermal calculator estimating that the selected temperature has been approached in another of the x-ray tubes.

2. The CT scanner of claim 1 wherein the thermal calculator includes:

at least one timer which times a length of time an x-ray tube has been powered;

a thermal profile memory which stores at least one time/temperature curve for anodes at a selected power level; and a comparator which applies the powered time to the thermal profile memory to estimate anode temperature and determine that the selected temperature has been reached.

3. The CT scanner of claim 1 wherein the thermal calculator includes:

at least one temperature sensor which provides a temperature signal representative of the anode temperature, and a comparator which compares the sensed temperature to a selected temperature and controls the switch in accordance with the comparing.

4. The CT scanner of claim 1 further including:

an angular position encoder which generates an angle signal representative of a present angular position of the rotating gantry relative to the examination region; and a couch encoder which generates a couch signal representative of a present position of a subject supporting couch in the examination region, the reconstruction processor receiving the angle signal and the couch signal.

5. The CT scanner of claim 1 further including:

an angular position encoder which generates an angle signal representative of a present angular position of the rotating gantry relative to the examination region; and a delay circuit connected with the angular position encoder and the switch assembly for noting an angular position at which a first of the x-ray tubes is switched off and delaying switching on of a second of the x-ray tubes until the second tube is approaching the noted angular position.

6. The CT scanner of claim 1 further including:

an x-ray tube failure detector which detects a failure of an x-ray tube and provides a fail signal to the switch assembly to prevent the switch assembly from trying to power the failed x-ray tube.

7. A method of diagnostic imaging comprising:

rotating a plurality of x-ray sources about a subject;

alternatingly powering the x-ray sources while the sources are rotating;

measuring a time the x-ray source is powered;

measuring power into the powered x-ray source;

comparing the time and power from the measuring steps with a stored thermal profile; and determining whether to power another of the x-ray sources based on the comparing step.

8. A method of diagnostic imaging comprising:

rotating a plurality of x-ray sources about a subject;

noting an angular position when a first of the x-ray sources is depowered;

delaying powering a second of the x-ray sources until the second source is at the angular position noted; and, receiving x-rays from at least one of the sources.

9. A method of diagnostic imaging comprising:

rotating a plurality of x-ray sources about a subject;

alternatingly powering the x-ray sources while the sources are rotating;

monitoring a temperature of the x-ray source being powered;

comparing the monitored temperature with preselected temperature conditions; and determining whether to power another of the x-ray sources based on the comparing step.

10. A method of diagnostic imaging comprising:

concurrently rotating at least a first x-ray tube and a second x-ray tube around a subject;

cyclically (a) powering the first x-ray tube while the second x-ray tube cools, and (b) powering the second x-ray tube while the first x-ray tube cools;

monitoring the x-ray tubes for a failure condition; and inhibiting cycling between steps (a) and (b) in response to the monitoring step such that the cycling stops in response to a monitored failure condition.

11. The method of claim 10 further including:

after monitoring the failure condition in one of the x-ray tubes, performing diagnostic imaging procedures with only the other x-ray tube; and replacing the x-ray tube with the failure condition after the diagnostic imaging procedures are completed.

12. A method of diagnostic imaging comprising:

concurrently rotating at least a first x-ray tube and a second x-ray tube around a subject;

cyclically (a) powering the first x-ray tube while the second x-ray tube cools, and (b) powering the second x-ray tube while the first x-ray tube cools;

monitoring thermal loading conditions of the one of the first and second x-ray tubes that is being powered;

comparing the monitored thermal loading conditions with preselected thermal loading conditions; and in response to the comparing step, switching between steps (a) and (b).

13. The method of claim 12 further including:

(c) powering a third x-ray tube while the first and second x-ray tubes cool.

14. The method of claim 12 further including:

monitoring the x-ray tubes for an arcing condition; and inhibiting the switching between steps (a) and (b) in response to the monitoring step.

15. A method of diagnostic imaging in which x-rays are received on a plurality of detectors, and processed into an image representation and the image is displayed, the method further including:

powering a first of at least two x-ray tubes for a first amount of time;

switching power from the first x-ray tube to a second x-ray tube;

powering the second x-ray tube for a second amount of time;

switching power from the second x-ray tube to the first x-ray tube;

determining a temperature of an anode of the powered x-ray tube; and switching the power in response to the determined temperature.

16. The method of claim 15 wherein the temperature determining step includes:

integrating an amount of power supplied to the powered x-ray tube over a duration the tube is powered;

comparing the integrated power with a thermal profile indicative of heating characteristics of an anode of the x-ray tube.

* * * * *